United States Patent [19]

Theis

[11] Patent Number: 4,800,583

[45] Date of Patent: Jan. 24, 1989

[54] OVERFLOW CALL HANDLING SYSTEM

[76] Inventor: Peter F. Theis, 3203 Bay View La., McHenry, Ill. 60050-9621

[21] Appl. No.: 899,538

[22] Filed: Aug. 22, 1986

Related U.S. Application Data

[63] Continuation-in-part of Ser. No. 892,196, Jul. 31, 1986, abandoned.

[51] Int. Cl.⁴ .................. H04M 1/57; H04M 3/50; H04Q 3/64
[52] U.S. Cl. .................................. 379/67; 379/84; 379/96; 379/142; 379/211; 379/214; 379/266
[58] Field of Search ............... 379/88, 89, 84, 112, 379/113, 221, 266, 273, 210, 211, 212, 213, 214, 67, 96, 142

[56] References Cited

U.S. PATENT DOCUMENTS

| | | | |
|---|---|---|---|
| 3,045,067 | 7/1962 | Nilsson et al. | 379/84 |
| 4,256,928 | 3/1981 | Lesea et al. | 379/214 |
| 4,338,494 | 7/1982 | Theis | 379/72 |
| 4,400,587 | 8/1983 | Taylor et al. | 379/113 |
| 4,408,100 | 10/1983 | Pritz et al. | 379/67 |
| 4,430,726 | 2/1984 | Kasday | 364/900 |
| 4,446,337 | 5/1984 | Cofer | 379/207 |
| 4,484,031 | 11/1984 | Gray et al. | 379/212 |
| 4,652,700 | 3/1987 | Matthews et al. | 379/89 |
| 4,696,028 | 9/1987 | Morganstein | 379/88 |

FOREIGN PATENT DOCUMENTS 0193162  11/1982  Japan .................. 379/244

Primary Examiner—Thomas W. Brown
Attorney, Agent, or Firm—Willian Brinks Olds Hofer Gilson & Lione Ltd.

[57] ABSTRACT

Overflow calls intended for a telephone answering center are automatically diverted to an overflow center which automatically answers the overflow calls and records information acquired from the overflow calls. This recorded information is digitally encoded and then transmitted back from the overflow station to the telephone answering center, where it is received and used to allow operators at the telephone answering center to place callbacks, or to take other appropriate action.

21 Claims, 3 Drawing Sheets

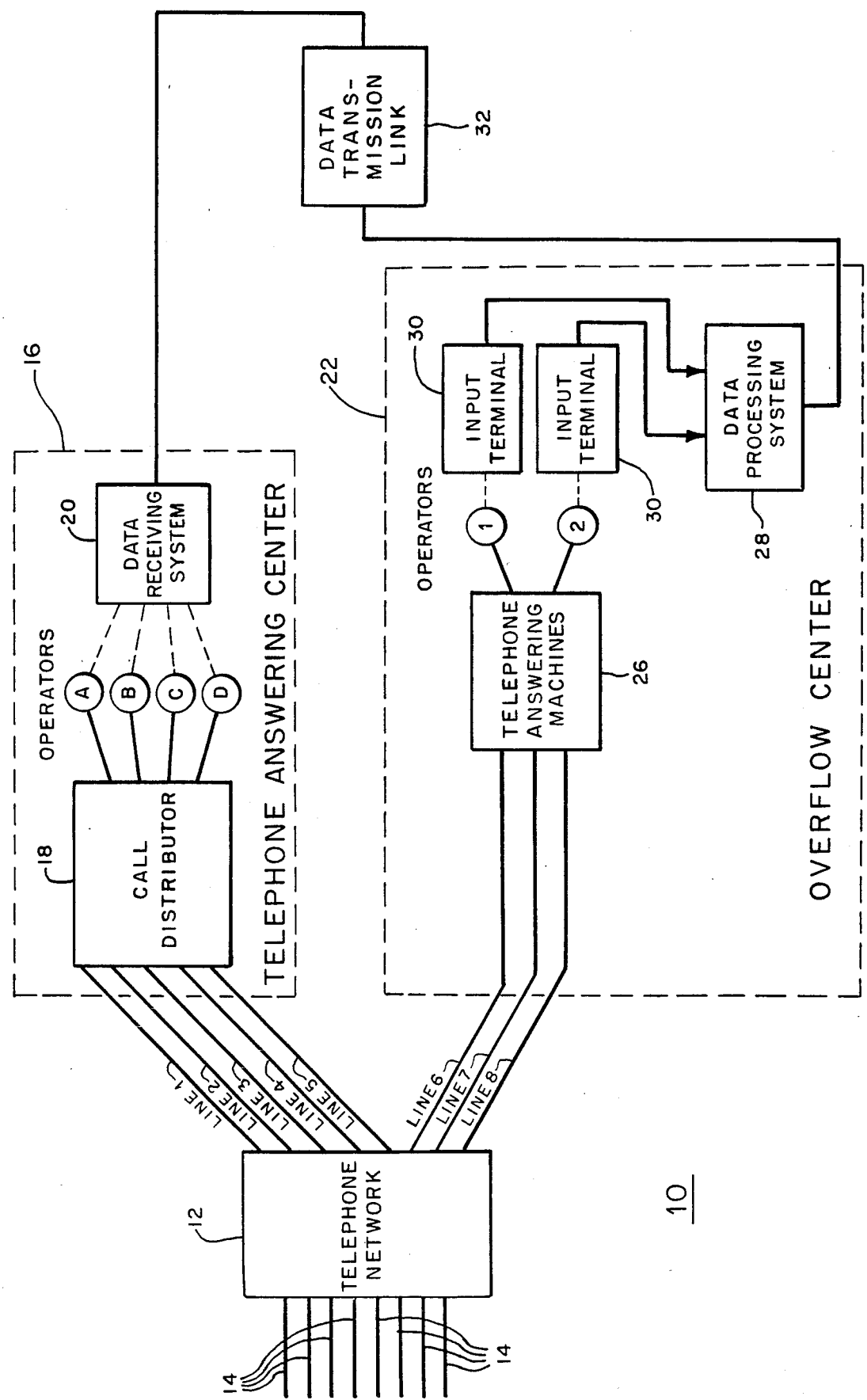

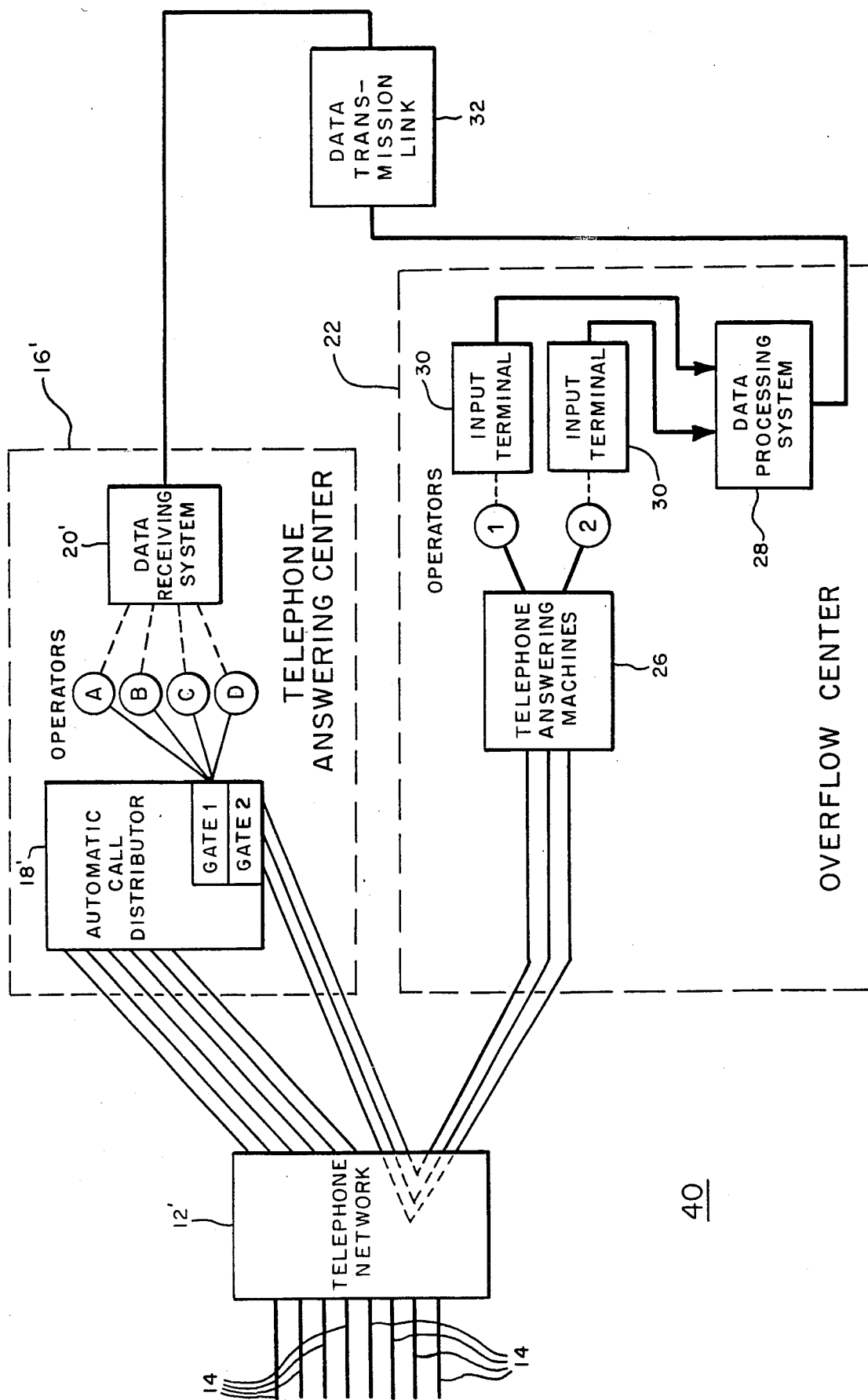

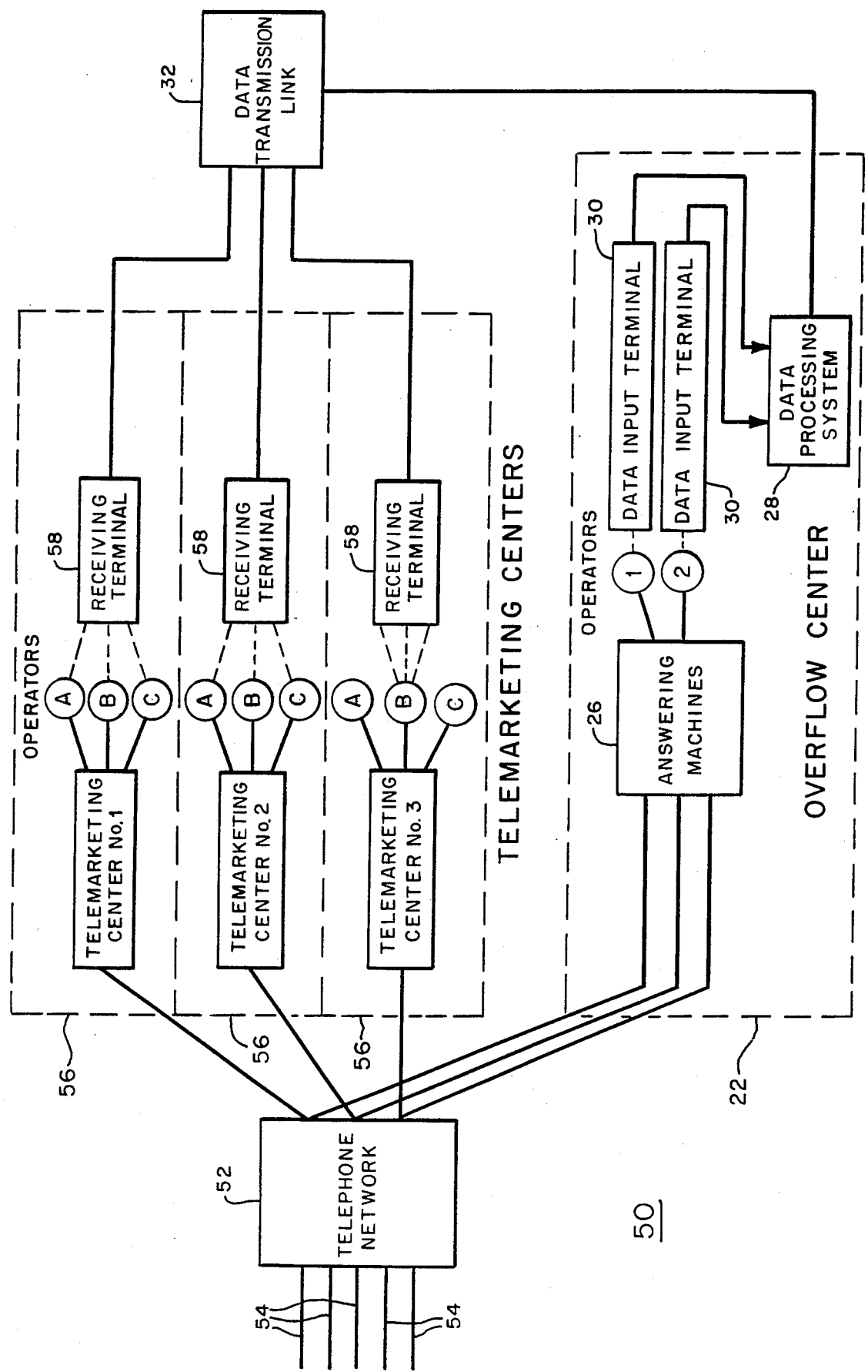

OVERFLOW CALL HANDLING SYSTEM

CROSS-REFERENCE TO RELATED APPLICATION

This application is a continuation-in-part of copending application Ser. No. 892,196, filed July 31, 1986, now abandoned.

BACKGROUND OF THE INVENTION

This invention relates to a telephone answering system for handling overflow calls from a telephone answering center.

Telephone answering centers have come into widespread use. Typically, such centers include a number of operator stations, ech adapted to receive telephone calls directed to a common number. For example, sales order centers and service centers may include a large number of operators, all handling calls directed to the same number.

During periods of peak traffic, such telephone answering centers suffer from a severe problem of overflow calls that cannot be handled by the answering center itself. In the past, a number of approaches have been used in an attempt to handle such overflow calls.

The simplest approach is to place the overflow calls on hold or to present the overflow calls with a busy signal. This approach brings with it important disadvantages because a significant number of callers placed on hold will simply hang up, and a significant number of callers presented with a busy signal will not call back.

A second approach is to divert overflow calls automatically from the telephone answering center to another service center. For example, automatic call distributors have been used in the past to route overflow calls automatically from a first telephone answering center, such as a sales order center, to a second telephone answering center, such as a service center, which can be either situated remotely or at the same location as the first answering center. In a somewhat similar manner, national airline reservation networks include a numer of airline reservation centers, along with means for automatically diverting overflow calls from a first to a second center. Under this approach overflow calls are handled live at the second center, and therefore relatively specifically trained operators are required in order to handle the overflow calls properly.

A third approach to the overflow call problem is to direct overflow calls at the telephone answering center to telephone answering machines at the center. Such telephone answering machines record information from the caller, which typically includes the name and telephone number of the caller, along with additional information that may help in handling the call. Such answering machines at the telephone answering center have been used with automatic call distributors of the type described above. This approach places the telephone answering machines at the same location as the telephone answering center, and it requires personnel from the telephone answering center to transcribe the recorded messages on the telephone answering machines, and then to act on this transcribed information. Typically, if a telephone answering center is overloaded, personnel are not available to perform these transcription activities. For this reason excessive delays often occur between the time an overflow call is received, and the time the recorded information is transcribed and acted upon.

The present invention is directed to an improved system for handling overflow calls from a telephone answering center, which to a large extent overcomes the problems of the prior art described above.

SUMMARY OF THE INVENTION

According to this invention, a telephone answering system for handling overflow calls from a telephone answering center comprises means for automatically diverting overflow calls from the telephone answering center to an overflow center. Means are provided at the overflow center for automatically answering the overflow calls and for automatically recording information acquired from individual ones of the overflow callers. The overflow center also includes means for digitally encoding this recorded information and for transmitting the digitally encoded information from the overflow center back to the telephone answering center, where the digitally encoded information is received.

Thus, the present invention provides an overflow center which automatically answers overflow calls and records caller messages. Operators at the overflow center then transcribe the messages, and digitally encode the transcribed messages for transmission back to the telephone answering center. Operators at the telephone answering center can then act on the digitally encoded information to place a call back or otherwise to act on the information left by the caller.

Because the overflow center includes personnel for transcribing and digitally encoding the recorded information, overflow calls are automatically handled without increasing the workload of personnel at the telephone answering center. Because the overflow center uses answering machines to handle the overflow calls, the operators at the overflow center do not need to be extensively trained in the business of the telephone answering center. For this reason, a single overflow center can provide the service of handling overflow calls to a large number of separate answering centers, in a low-cost, efficient manner. As used herein, the term "overflow center" is used to denote a separate facility from the answering center, staffed by a separate set of operators.

The invention itself, together with further objects and attendant advantages, will best be understood by reference to the following detailed description, taken in conjunction with the accompanying drawings.

BRIEF DESCRIPTION OF THE DRAWINGS

FIG. 1 is a schematic diagram of a first preferred embodiment of this invention.

FIG. 2 is a schematic diagram of a second preferred embodiment of this invention.

FIG. 3 is a schematic diagram of a third preferred embodiment of this invention.

DETAILED DESCRIPTION OF THE PRESENTLY PREFERRED EMBODIMENTS

Turning now to the drawings, FIG. 1 schematically represents a first preferred embodiment 10 of this invention which includes a telephone answering center 16 and an overflow center 22. Typically, the overflow center 22 will be located in a separate office or building and often in a separate city from the center 16.

The telephone answering center 16 includes a call distributor 18 which automatically distributes incoming calls to a number of operators A–D who service the calls in the conventional manner. The overflow center 22 includes a plurality of answering machines 26. These answering machines 26 present prerecorded messages to the callers and record caller responses Operators 1 and 2 transcribe these recorded resonses as explained in greater detail below. Preferably, the answering machines 26 are conversational answering machines which conduct a programmed conversation with the caller by presenting a plurality of prerecorded prompt messages to the caller and then recording caller responses to these prompt messages.

The telephone answering center 16 is often situated remotely from the overflow center 22, and both the answering center 16 and the overflow center 22 receive incoming calls from a telephone network 12. The telephone network 12 can include the public telephone network, a private network, or some combination of the two. In this embodiment, the telephone network 12 receives incoming calls on telephone lines 14, is connected to the call distributor 18 by lines 1–5, and is connected to the answering machines 26 by lines 6–8. Lines 1–8 are treated as a hunt group by the telephone network 12. That is, incoming calls on telephone lines 14 are initially passed to the call distributor 18 via line 1. If line 1 is busy, calls are passed to the call distributor 18 via line 2, and so forth. In the event all five lines 1–5 are busy, the telephone network 12 will automatically pass incoming calls via line 6 to the answering machines 26. Thus, calls only appear on lines 6–8 in the event all of lines 1–5 are busy. In this way, the telephone network 12 automatically routes overflow calls which cannot be handled by the telephone answering center 16 to the overflow center 22.

The overflow center 22 includes a data processing system 28 which includes an input terminal 30 for each of the operators 1,2. This data processing system 28 is connected via a data transmission link 32 such as a private or public telephone system to a data receiving system 20 included in the telephone answering center 16. The data receiving system 20 can include a CRT display, a printer, or other means for displaying the received digital information. The operators 1,2 at the overflow center 12 use the input terminals 30 to encode and store the transcribed information from the answering machines 26 in digital form.

The data processing system 28 automatically transmits this stored digital information via the data transmission link 32 to the data receiving system 20, where it is presented to the operators A–D of the telephone answering center 16. For example, this digitally transmitted information may include caller identification (name and telephone number), the reason for the call, the time of the call, and the like. The operators A–D can then use this digital information to group the overflow calls based upon the urgency or type of call and to act on them as appropriate. In many cases, the operators A–D will call back the callers who made the overflow calls. Because information relating to the purpose and identity of the caller is displayed by the data receiving system 20, the operators A–D can handle the highest priority calls or the type of calls for which the operators are best trained first. For example, sales orders are often considered to be of higher priority than general inquiries, and can be handled by the operators A–D first.

FIG. 2 shows a schematic representation of a second preferred embodiment 40 of this invention. This second preferred embodiment 40 includes an overflow center 22 identical to that described above and a telephone answering center 16' which is similar to the telephone answering center 16 described above. The principal difference between the two embodiments 10,40 is that the telephone answering center 16' includes an automatic call distributor 18' which automatically diverts overflow calls to the overflow center 22. Such automatic call distributors are commercially available and operate to direct incoming calls from the telephone network 12' initially via Gate 1 to the operators A–D. In the event an incoming call is not picked up in a timely fashion, the automatic call distributor 18' automatically routes the incoming call via Gate 2 and the telephone network 12' to the overflow center 22. In all other respects, the embodiment 40 operates similarly to the embodiment 10 to provide the operators A–D with digital information relevant to overflow calls handled by the overflow center 22.

FIG. 3 shows a schematic representation of a third preferred embodiment 50 of this invention. This third embodiment 50 includes a public telephone network 52 which receives incoming calls on telephone lines 54 intended for any one of three separate telemarketing centers 56. These telemarketing centers 56 may, for example, be operated by separate companies for separate purposes. Each of the telemarketing centers 56 includes at least one operator station at which an operator handles incoming calls. These operators receive digital information from receiving terminals 58. Overflow calls which cannot be handled in a timely fashion by the telemarketing centers 56 are automatically diverted via the telephone network 52 to the remote overflow center 22, where they are answered by the answering machines 26. Thus, the answering machines 26 respond to overflow calls from all three of the telemarketing centers 56. The operators 1,2 transcribe recorded information from the answering machines 26 and enter this information on data input terminals 30, which are connected to the data processing system 28. The data processing system 28 transmits the digitally encoded information for appropriate ones of the overflow calls via the data transmission link 32 to the receiving terminal 58 at the telemarketing center 56 to which the overflow calls were originally directed.

The embodiment of FIG. 3 operates similarly to the embodiments of FIGS. 1 and 2, and it shows the manner in which a single remote overflow center 22 can be used to handle overflow calls from a number of telephone answering centers such as telemarketing centers 56.

The individual components of the embodiments described above are commercially available items, the construction of which does not form part of this invention. Components in standard use for telephone answering centers can be used for the call distributor 18. Similarly, a variety of equipment can be used for the answering machines 26 of the overflow center 22. The system marketed by Conversational Voice Technologies Corporation of Gurnee, Illinois as the ConMode system is particularly well-suited for this application. The manner in which the ConMode system operates is described in detail in U.S. Pat. No. 4,539,436. Furthermore, as explained above, automatic call distributors of the type shown in FIG. 2 are well-known to those skilled in the art, and can be obtained from suppliers such as Teknekron Corp of Richardson, Tx. (Infoswitch ACD), AT&T (80/5 Management System) or Telcom Technolgies of San Dimas, Cal. (ECD 1000 or ECD 2000). Any suitable computer-based data processing system, such as commonly available personal computers, can be used for the data processing system 28, the input terminals 30, and the data receiving systems 20,58.

From the foregoing, it should be apparent that a number of improved overflow call handling systems have been described which provide important advantages. These systems allow the true volume of callers to be known, because overflow calls are handled promptly. This is in contrast to systems which present callers with busy signals, which make it impossible to determine how many callers are represented. the systems described above allow a telephone answering center to increase its peak call handling capabilities without adding personnel. These systems can be used to increase the productivity of a telephone answering center because the overflow center can provide information allowing the personnel at the telephone answering center to assess the priority or the grouping of the overflow calls. Furthermore, incoming lines to the telephone answering center are not occupied with incoming calls that have been placed on hold. If desired, the digitally encoded data transmitted to the telephone answering center can be used in conjunction with automatic calling systems so that callbacks can be placed automatically and retried automatically.

Because this invention allows a single remote overflow center to service a number of telephone answering centers, efficiencies of scale can be obtained. Furthermore, since the overflow center can be operated and staffed by persons skilled in the art of programming, maintaining and working with answering machines, such a professionally operated overflow center 22 can be expected to operate more efficiently and reliably than can answering machines programmed and operated by those without extensive experience in the field.

Of course, it should be understood that a wide range of changes and modifications can be made to the preferred embodiments described above. A wide variety of hardware components can be used to accomplish the functions described above. For example, in some applications dedicated lines may be used to link the answering centers with the overflow center. It is therefore intended that the foregoing detailed description be regarded as illustrative rather than limiting, and that it be understood that it is the following claims, including all equivalents, which are intended to define the scope of this invention.

I claim:

1. A telephone answering system for use with a set of one or more telephone centers for handling overflow calls from at least a first one of the telephone centers of the type which comprises at least one operator station and means for interconnecting the operator station with a telephone line, said system comprising:
   an overflow station;
   means for automatically diverting overflow calls on the telephone line from the first telephone center to the overflow station;
   means, located at the overflow station, for automatically answering the overflow calls and automatically recording caller responses from individual overflow callers, and for allowing said recorded caller responses to be transcribed;
   means, located at the overflow station, for digitally encoding information obtained from transcribed ones of said caller responses;
   means for transmitting said digitally encoded information from the overflow station to a selected telephone center included in the set of telephone centers; and
   means for receiving said digitally encoded information at the selected telephone center.

2. The invention of claim 1 wherein said digitally encoded information comprises call grouping information and caller identification information.

3. The invention of claim 1 wherein the encoding means, the transmitting means and the receiving means comprise a computer system having at least one data input terminal at the overflow station, at least one receiving terminal at the selected telephone center for visually displaying the digitally encoded information, and a data transmittion link between the terminals.

4. The invention of claim 1 wherein the diverting means directs the overflow calls via a public telephone network and associated telephone lines to the overflow station.

5. The invention of claim 1 wherein the receiving means comprises means for visually displaying said received information at the selected telephone center.

6. The invention of claim 1 wherein the means for answering the overflow calls comprises means for conducting a programmed conversation with individual overflow callers by presenting a plurality of prerecorded prompt messages to the callers and recording caller responses to these prompt messages.

7. A telephone answering system for handling overflow calls from a plurality of telephone answering centers, each of the type which comprises at least one operator station and means for interconnecting the operator station with a telephone line, said system comprising:
   an overflow station;
   means for automatically diverting overflow calls on the telephone lines from each of the telephone answering centers tothe overflow station;
   means, located at the overflow station, for automatically answering the overflow calls and for automatically recording caller responses from individual overflow callers;
   means, located at the overflow station, for accommodating transcription of the recorded caller responses;
   means, located at the overflow station, for digitally encoding information obtained from transcribed ones of said caller responses;
   means for transmitting said digitally encoded information acquired from said transcribed caller responses from the overflow station to selected ones of the telephone answering centers to which the overflow calls were originally directed; and
   means for receiving said digitally encoded recorded information at the telephone answering centers.

8. The invention of claim 7 wherein said digitally encoded information comprises call grouping information and caller identification information.

9. The invention of claim 8 wherein the encoding means, the transmitting means and the receiving means comprise a computer system having at least one data input terminal at the overflow station, a receiving terminal at each of the telephone answering centers for visually displaying the digitally encoded information, and a data transmission link between the data input terminal and each of the receiving terminals.

10. The invention of claim 7 wherein the diverting means directs the overflow calls via a telephone network and associated telephone lines to the overflow station.

11. The invention of claim 7 wherein the receiving means each comprise means for visually displaying said received information at the respective telephone answering center.

12. The invention of claim 7 wherein the means for answering the overflow calls comprises means for conducting a programmed conversation with individual overflow callers by presenting a plurality of prerecorded prompt messages to the callers and recording caller responses to these prompt messages 13. A telephone answering system for handling overflow calls from a telephone answering center of the type which comprises at least one operator station and means for interconnecting the operator station with a telephone line, said system comprising:
   an overflow station;
   means for automatically diverting overflow calls on the telephone line from the telephone answering center to the overflow station;
   means, located at the overflow station, for automatically answering the overflow calls and automatically recording caller responses from individual overflow callers, and for allowing said recorded caller responses to be transcribed;
   means, located at the overflow station, for digitally encoding information obtained from transcribed ones of said caller responses;
   means for transmitting said digitally encoded information from the overflow station to a selected telephone center, remote from the overflow center; and
   means for receiving said digitally encoded information at the selected telephone center.

14. The invention of claim 13 wherein said digitally encoded information comprises call grouping information and caller identification information.

15. The invention of claim 13 wherein the encoding means, the transmitting means and the receiving means comprise a computer system having at least one data input terminal at the overflow station, at least one receiving terminal at the selected telephone center for visually displaying the digitally encoded information, and a data transmission link between the terminals.

16. The invention of claim 13 wherein the diverting means directs the overflow calls via a public telephone network and associated telephone lines to the overflow station.

17. The invention of claim 13 wherein the receiving means comprises means for visually displaying said received information at the selected telephone center.

18. The invention of claim 13 wherein the means for answering the overflow calls comprises means for conducting a programmed conversation with individual overflow callers by presenting a plurality of prerecorded prompt messages to the callers and recording caller responses to these prompt messages.

19. The invention of claim 13 wherein said automatically answering means allows said recorded caller responses to be transcribed by an operator, and wherein said digitally encoding means is controlled by said operator.

20. The invention of claim 1 wherein said automatically answering means allows said recorded caller responses to be transcribed by an operator, and wherein said digitally encoding means is controlled by said operator.

21. The invention of claim 7 wherein said transcription accommodating means allows said recorded caller responses to be transcribed by an operator, and wherein said digitally encoding means is controlled by said operator.

* * * * *